(12) United States Patent
Tseng et al.

(10) Patent No.: US 11,774,320 B1
(45) Date of Patent: Oct. 3, 2023

(54) ACOUSTIC IMPEDANCE MEASURING SYSTEM AND ACOUSTIC IMPEDANCE MEASURING METHOD

(71) Applicant: xMEMS Labs, Inc., Santa Clara, CA (US)

(72) Inventors: Kuan-Ju Tseng, Hsinchu (TW); Wen-Chien Chen, New Taipei (TW); Chiung C. Lo, San Jose, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/333,561

(22) Filed: Jun. 13, 2023

Related U.S. Application Data

(60) Provisional application No. 63/426,371, filed on Nov. 18, 2022.

(51) Int. Cl.
G01M 7/02 (2006.01)

(52) U.S. Cl.
CPC ............ G01M 7/025 (2013.01); G01M 7/027 (2013.01)

(58) Field of Classification Search
CPC ......... G01M 7/025; G01M 7/027; G01M 7/02
See application file for complete search history.

(56) References Cited

U.S. PATENT DOCUMENTS

| | | | | |
|---|---|---|---|---|
| 3,835,263 | A * | 9/1974 | Killion | H04R 25/402 381/313 |
| 2011/0087256 | A1 * | 4/2011 | Wiener | H10N 30/802 606/169 |
| 2017/0276540 | A1 * | 9/2017 | Qiu | G01H 3/00 |

* cited by examiner

*Primary Examiner* — Suman K Nath
(74) *Attorney, Agent, or Firm* — Winston Hsu

(57) ABSTRACT

An acoustic impedance measuring system configured to measure an acoustic impedance of an acoustic component includes a first chamber, a second chamber, a first sound pressure sensing device, a second sound pressure sensing device and a sound source. The first sound pressure sensing device is configured to sense a sound pressure in the first chamber. The second sound pressure sensing device is configured to sense a sound pressure in the second chamber. The sound source is connected to the first chamber, wherein the sound source generates a sound propagating towards a first cavity inside the first chamber. The acoustic component is disposed between the first chamber and the second chamber for being measured the acoustic impedance of the acoustic component, and the acoustic impedance of the acoustic component is measured by the first sound pressure sensing device and the second sound pressure sensing device.

20 Claims, 11 Drawing Sheets

US 11,774,320 B1

ACOUSTIC IMPEDANCE MEASURING SYSTEM AND ACOUSTIC IMPEDANCE MEASURING METHOD

CROSS REFERENCE TO RELATED APPLICATIONS

This application claims the benefit of U.S. Provisional Application No. 63/426,371, filed on Nov. 18, 2022. The content of the application is incorporated herein by reference.

BACKGROUND OF THE INVENTION

1. Field of the Invention

The present application relates to an acoustic impedance measuring system and an acoustic impedance measuring method, and more particularly, to an acoustic impedance measuring system capable of measuring an acoustic impedance of an acoustic component, and to a related acoustic impedance measuring method.

2. Description of the Prior Art

Nowadays, acoustic devices can be widely used in various electronic devices. In order to enhance the performance of the acoustic device, all components in the acoustic device need to have properties and parameters suitable for the acoustic device.

The performance of the acoustic device is highly related to suitability of an acoustic impedance of the component in the acoustic device. However, there is no instrument and system that measures the acoustic impedance of the component well at present. Thus, there is an urgent requirement for a system or an instrument which is capable of accurately measuring the acoustic impedance of the component.

SUMMARY OF THE INVENTION

It is therefore a primary objective of the present invention to provide an acoustic impedance measuring system having a plurality of chambers, such that an acoustic impedance of an acoustic component disposed between these chambers would be measured. Furthermore, a related acoustic impedance measuring method is provided in the present invention also.

An embodiment of the present invention provides an acoustic impedance measuring system configured to measure an acoustic impedance of an acoustic component. The acoustic impedance measuring system includes a first chamber, a second chamber, a first sound pressure sensing device, a second sound pressure sensing device and a sound source. A first cavity exists inside the first chamber, and a second cavity exists inside the second chamber. The first sound pressure sensing device is configured to sense a sound pressure in the first chamber. The second sound pressure sensing device is configured to sense a sound pressure in the second chamber. The sound source is connected to the first chamber, wherein the sound source generates a sound propagating towards the first cavity. The acoustic component is disposed between the first chamber and the second chamber for being measured the acoustic impedance of the acoustic component, and the acoustic impedance of the acoustic component is measured by the first sound pressure sensing device and the second sound pressure sensing device.

Another embodiment of the present invention provides an acoustic impedance measuring method including: providing an acoustic impedance measuring system; and performing a first measuring process on an acoustic object. The acoustic impedance measuring system includes a first chamber, a second chamber and a sound source, wherein a first cavity exists inside the first chamber, a second cavity exists inside the second chamber, a sound source is connected to the first chamber, and the sound source generates a sound propagating towards the first cavity. The first measuring process includes: disposing the acoustic object between the first chamber and the second chamber; and sensing a first sound pressure in the first chamber and a second sound pressure in the second chamber when generating the sound by the sound source, wherein a first overall acoustic impedance of the acoustic object is obtained according to the first sound pressure and the second sound pressure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
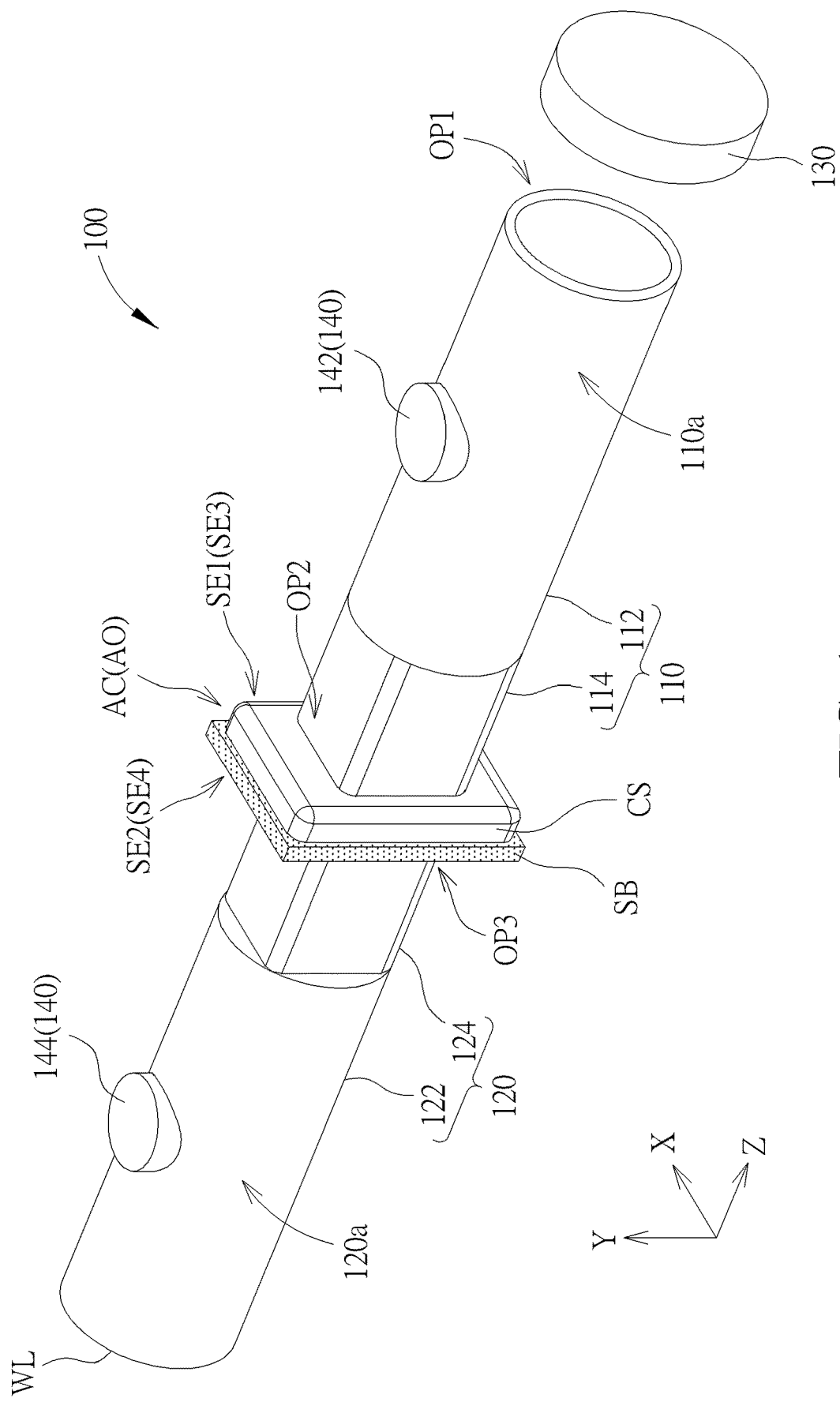
FIG. 1 is a schematic diagram illustrating an acoustic impedance measuring system according to an embodiment of the present invention.

To provide a better understanding of the present invention to those skilled in the art, preferred embodiments and typical material or range parameters for key components will be detailed in the follow description. These preferred embodiments of the present invention are illustrated in the accompanying drawings with numbered elements to elaborate on the contents and effects to be achieved. It should be noted that the drawings are simplified schematics, and the material and parameter ranges of key components are illustrative based on the present day technology, and therefore show only the components and combinations associated with the present invention, so as to provide a clearer description for the basic structure, implementing or operation method of the present invention. The components would be more complex in reality and the ranges of parameters or material used may evolve as technology progresses in the future. In addition, for ease of explanation, the components shown in the drawings may not represent their actual number, shape, and dimensions; details may be adjusted according to design requirements.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present invention, the corresponding features, areas, steps, operations and/or components would be pointed to existence, but not limited to the existence of one or a plurality of the corresponding features, areas, steps, operations and/or components.

In the following description and in the claims, when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented.

In the following description and in the claims, when "a A1 component is formed by/of B1", B1 exist in the formation of A1 component or B1 is used in the formation of A1 component, and the existence and use of one or a plurality of other features, areas, steps, operations and/or components are not excluded in the formation of A1 component.

In the following description and in the claims, the term "substantially" generally means a small deviation may exist or not exist. For instance, the terms "substantially parallel" and "substantially along" means that an angle between two components may be less than or equal to a certain degree threshold, e.g., 10 degrees, 5 degrees, 3 degrees or 1 degree. For instance, the term "substantially aligned" means that a deviation between two components may be less than or equal to a certain difference threshold, e.g., 2 μm or 1 μm. For instance, the term "substantially the same" means that a deviation is within, e.g., 10% of a given value or range, or mean within 5%, 3%, 2%, 1%, or 0.5% of a given value or range.

In the description and following claims, the term "horizontal direction" generally means a direction parallel to a horizontal surface, the term "horizontal surface" generally means a surface parallel to a direction X and direction Y in the drawings (i.e., the direction X and the direction Y of the present invention may be considered as the horizontal directions), the term "vertical direction" generally means a direction parallel to a direction Z and perpendicular to the horizontal direction in the drawings, and the direction X, the direction Y and the direction Z are perpendicular to each other. In the description and following claims, the term "top view" generally means a viewing result viewing along one vertical direction, and the term "bottom view" means a viewing result viewing along another vertical direction opposite to the vertical direction related to the top view.

Although terms such as first, second, third, etc., may be used to describe diverse constituent elements, such constituent elements are not limited by the terms. The terms are used only to discriminate a constituent element from other constituent elements in the specification, and the terms do not relate to the sequence of the manufacture if the specification do not describe. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present invention.

In the present invention, an acoustic impedance measuring system is configured to measure an acoustic impedance of an acoustic component to be disposed in an acoustic device, wherein the acoustic device is related to an acoustic wave (e.g., a sound wave and/or an ultrasonic wave). In some embodiments, the acoustic device may generate the acoustic wave or receive the acoustic wave, or the acoustic device may be a path which the acoustic wave passes through.

The acoustic component may be a component related to the acoustic wave (e.g., the acoustic component generates the acoustic wave or receives the acoustic wave, or the acoustic component may be a path which the acoustic wave passes through), and/or the acoustic component may enhance the experience of the user using the acoustic device. The acoustic component may be controlled by signals, generate signals according to an acoustic wave, or has nothing to do with signals, wherein the signals may be electric signals or signals with other suitable type.

In some embodiments, the acoustic component may be an acoustic transducer configured to perform an acoustic transformation, wherein the acoustic transformation may convert the signals (e.g. electric signals) into an acoustic wave, or may convert an acoustic wave into signals with other suitable type (e.g. electric signals). For example, the acoustic transducer may be a sound producing component, a speaker, a micro speaker or other suitable device, so as to convert the electric signals into the acoustic wave, but not limited thereto. For example, the acoustic transducer may be a sound measuring device, a sound pressure sensing device, a microphone or other suitable device, so as to convert the acoustic wave into the electric signals, but not limited thereto.

In some embodiments, the acoustic component may have nothing to do with the electric signal. For example, the acoustic component may be a mesh configured to be disposed for covering a device opening (e.g., a sound outlet) of the acoustic device, and the dust and the liquid are hard to enter the acoustic device because of the existence of the mesh, but not limited thereto. Optionally, the acoustic wave may pass through the mesh, but not limited thereto.

In some embodiments, the acoustic component may be controlled by the electric signal. For example, the acoustic component may be a venting device, and a size of a venting opening of the venting device may be controlled by the electric signal. For example, the venting device may be configured to suppress an occlusion effect during the operation of the acoustic device (e.g., an in-ear earbud, an on-ear earphone or an over-ear earphone, etc.). The occlusion effect is due to the sealed volume of ear canal causing loud perceived sound pressure by the user (i.e., the listener). In some cases, the occlusion effect occurs while the user does specific motion(s) generating a bone-conducted sound (such as walking, jogging, talking, eating, touching the acoustic transducer, etc.) and uses the acoustic device filled in the user's ear canal, and the occlusion effect causes the user to hear the occlusion noise, thereby decreasing the listening quality of the user. Thus, because of the existence of the venting device, the volume of ear canal is not sealed when the venting opening of the venting device is opened, such that the occlusion effect may be suppressed, thereby enhancing the performance of the acoustic device and the experience of the user using the acoustic device.

In some embodiments, the acoustic component may be a MEMS (Micro Electro Mechanical System) component, but not limited thereto. Namely, the above component (e.g., the acoustic transducer, the venting device, the mesh or any other suitable component related to acoustics) may be a MEMS structure formed by semiconductor process, but not limited thereto.

In some embodiments, the acoustic component may be a package structure packaging the above component (e.g., the acoustic transducer, the venting device, the mesh or any other suitable component related to acoustics), but not limited thereto.

In the following, for instance, the acoustic component may be the venting device, and the acoustic device in which the acoustic component is to be disposed may generate be the acoustic wave (for example, the acoustic component is an in-ear earbud, an on-ear earphone or an over-ear earphone), but not limited thereto.

Referring to FIG. 1, FIG. 1 is a schematic diagram illustrating an acoustic impedance measuring system according to an embodiment of the present invention. As shown in FIG. 1, the acoustic impedance measuring system 100 includes a plurality of chambers connected to each other. In some embodiments (in FIG. 1), the acoustic impedance measuring system 100 includes a first chamber 110 and a second chamber 120 connected to each other, wherein a first cavity 110a exists inside the first chamber 110, and a second cavity 120a exists inside the second chamber 120.

The chambers may be designed based on requirement(s). For example, the first chamber 110 may be a tubular structure extending along the direction Z, the second chamber 120 may be another tubular structure extending along the direction Z, and the first chamber 110 may be connected to the second chamber 120 in the direction Z, but not limited thereto. For example, the first chamber 110 may have a first circular part 112 and a first rectangular part 114, the second chamber 120 may have a second circular part 122 and a second rectangular part 124, and the first rectangular part 114 and the second rectangular part 124 may be between the first circular part 112 and the second circular part 122 in the direction Z, but not limited thereto.

In FIG. 1, the first chamber 110 may have a first opening OP1 and a second opening OP2 respectively situated at the two opposite ends of the first chamber 110 in the direction Z. For instance, the first opening OP1 belongs to the first circular part 112 and serves as a sound inlet, and the second opening OP2 belongs to the first rectangular part 114, but not limited thereto. In FIG. 1, the second chamber 120 may have a third opening OP3 and a wall WL respectively situated at the two opposite ends of the second chamber 120 in the direction Z. For instance, the third opening OP3 belongs to the second rectangular part 124, and the wall WL belongs to the second circular part 122, but not limited thereto.

As shown in FIG. 1, the acoustic impedance measuring system 100 includes a sound source 130 connected to the first opening OP1 (i.e., the sound inlet) of the first chamber 110, wherein the sound source 130 generates a sound sequentially propagating towards the first cavity 110a and the second cavity 120a through the first opening OP1. The sound source 130 may be designed based on requirement(s).

As shown in FIG. 1, the acoustic impedance measuring system 100 includes a plurality of sound pressure sensing devices 140 to respectively sense the sound pressure (i.e., the acoustic wave) in the chambers, wherein the sound pressure (i.e., the acoustic wave) is caused by the sound source 130. In FIG. 1, the acoustic impedance measuring system 100 includes a first sound pressure sensing device 142 configured to sense the sound pressure in the first chamber 110 and a second sound pressure sensing device 144 configured to sense the sound pressure in the second chamber 120. For example, the first sound pressure sensing device 142 may be disposed in the first circular part 112 of the first chamber 110, and the second sound pressure sensing device 144 may be disposed in the second circular part 122 of the second chamber 120, but not limited thereto.

In the direction Z, the acoustic component AC is disposed between the first chamber 110 and the second chamber 120 for being measured the acoustic impedance of the acoustic component AC by the acoustic impedance measuring system 100. As shown in FIG. 1, a first side SE1 of the acoustic component AC is connected to and faces the first cavity 110a of the first chamber 110, and a second side SE2 of the acoustic component AC is connected to and faces the second cavity 120a of the second chamber 120. Namely, the first side SE1 of the acoustic component AC faces the first opening OP1 (i.e., the sound inlet) and the second opening OP2 of the first chamber 110, and the second side SE2 of the acoustic component AC faces the wall WL and the third opening OP3 of the second chamber 120.

Figure 2:
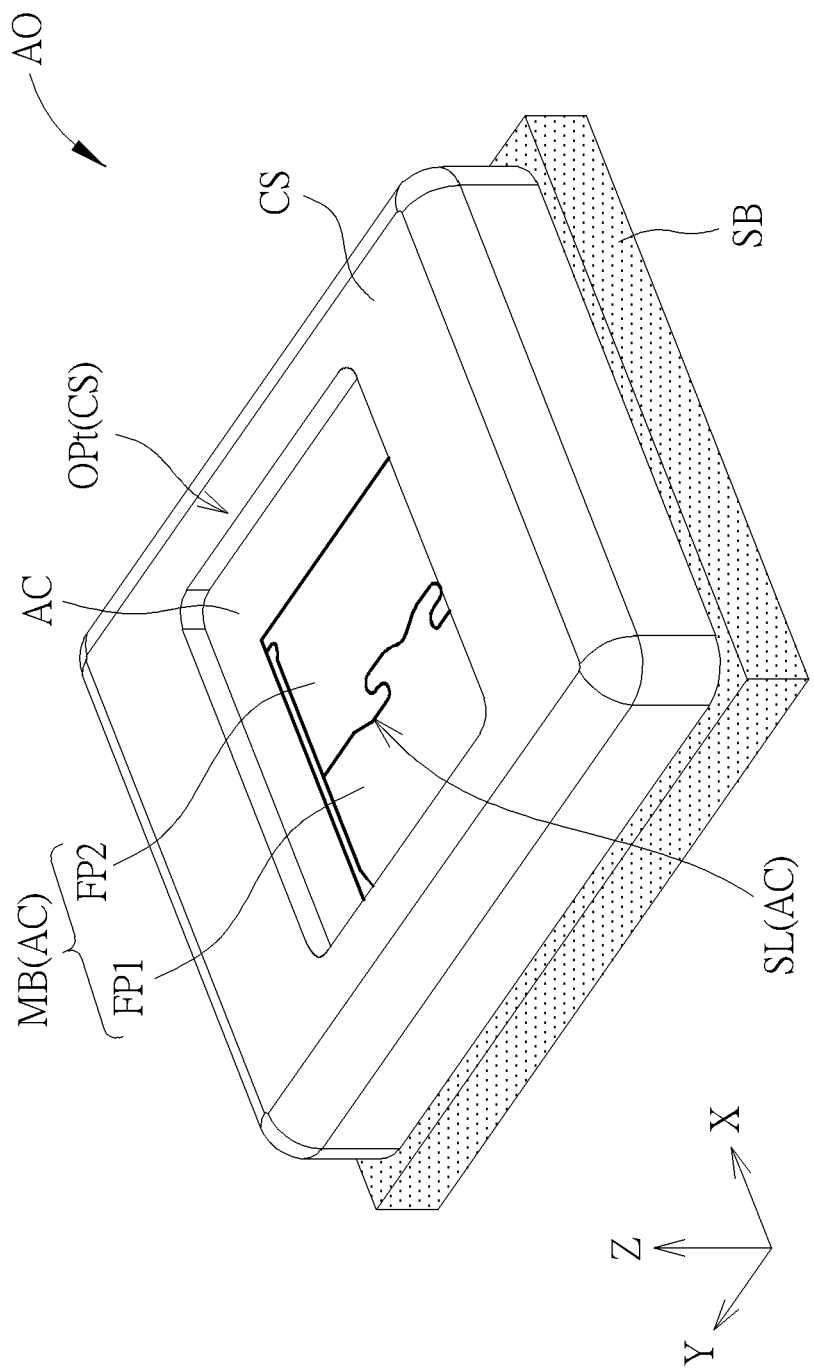
FIG. 2 is a schematic diagram illustrating an acoustic object according to an embodiment of the present invention.
Figure 3:
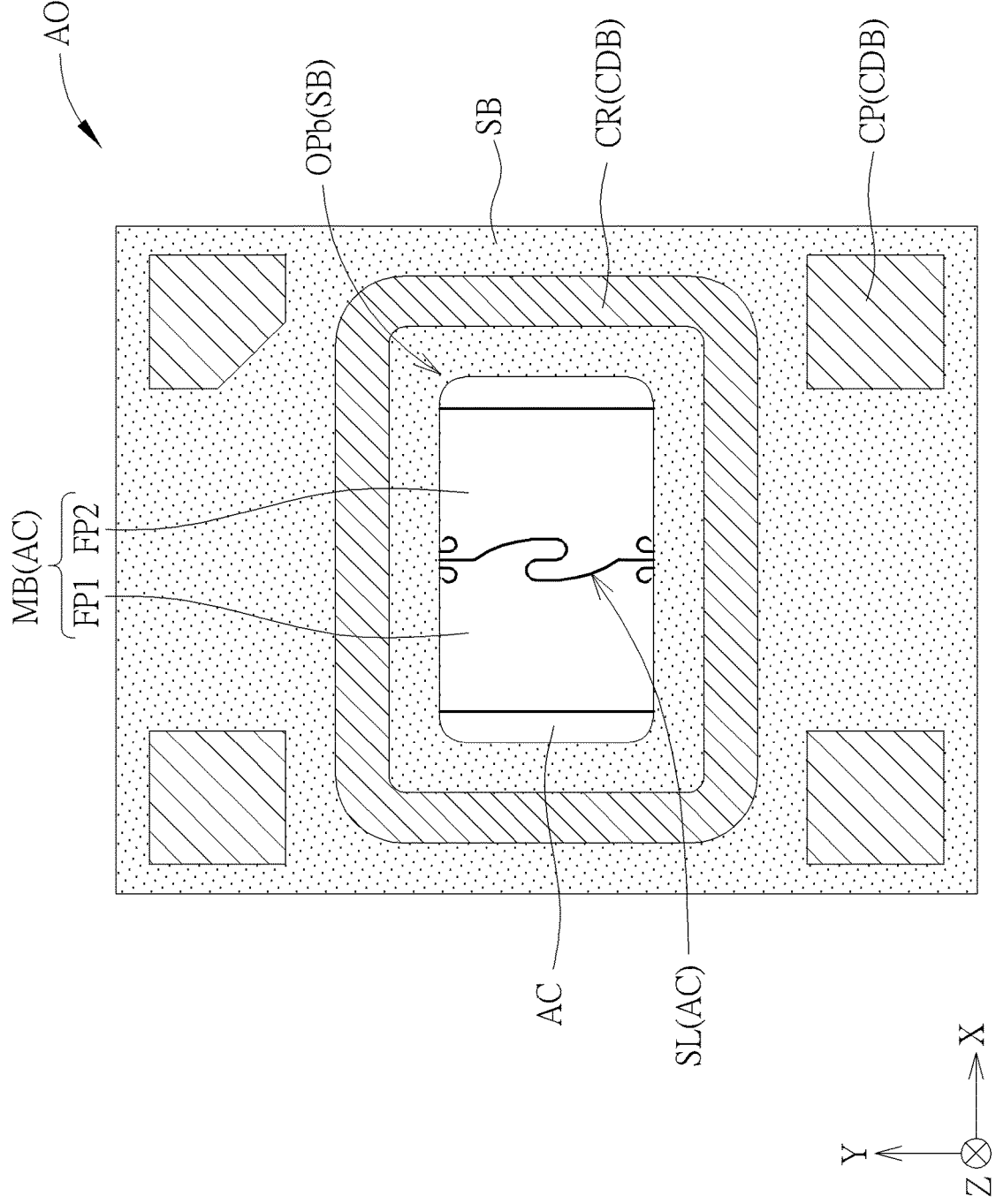
FIG. 3 is a schematic diagram of a bottom view illustrating the acoustic object of FIG. 2.

In some embodiments, as shown in FIG. 1 to FIG. 3, the acoustic component AC is disposed in an acoustic object AO (i.e., the acoustic object AO includes the acoustic component AC), wherein the acoustic object AO may be a package structure packaging the acoustic component AC. In FIG. 0.1, a third side SE3 of the acoustic object AO is connected to and faces the first cavity 110a of the first chamber 110, and a fourth side SE4 of the acoustic object AO is connected to and faces the second cavity 120a of the second chamber 120. Namely, the first side SE1 of the acoustic component AC and the third side SE3 of the acoustic object AO face the same direction, and the second side SE2 of the acoustic component AC and the fourth side SE4 of the acoustic object AO face the same direction. The third side SE3 of the acoustic object AO faces the first opening OP1 (i.e., the sound inlet) and the second opening OP2 of the first chamber 110, and the fourth side SE4 of the acoustic object AO faces the wall WL and the third opening OP3 of the second chamber 120.

As shown in FIG. 2 and FIG. 3 showing the acoustic object AO, the acoustic object AO further includes a substrate SB and a covering structure CS, wherein the acoustic component AC is disposed between the substrate SB and the covering structure CS. For example, in FIG. 1 and FIG. 2, the covering structure CS may be between the acoustic component AC and the first chamber 110, and the substrate SB may be between the acoustic component AC and the second chamber 120, but not limited thereto.

In FIG. 2 and FIG. 3, the covering structure CS has a top opening OPt, and the substrate SB has a bottom opening OPb. As shown in FIG. 1 to FIG. 3, in the direction Z, the top opening OPt of the covering structure CS may be corresponding to the second opening OP2 of the first chamber 110, the bottom opening OPb of the substrate SB may be corresponding to the third opening OP3 of the second chamber 120, such that the sound generated by the sound source 130 passes through the first chamber 110, the acoustic object AO and the second chamber 120.

The substrate SB may be designed based on requirement(s). The substrate SB may be hard or flexible, wherein the substrate SB may include silicon, germanium, glass, plastic, quartz, sapphire, metal, polymer (e.g., polyimide (PI), polyethylene terephthalate (PET)), any other suitable material or a combination thereof. As an example, the substrate SB may be a circuit board including a laminate (e.g., copper clad laminate, CCL), a land grid array (LGA) board or any other suitable board containing conductive material, but not limited thereto.

As shown in FIG. 3, the substrate SB has at least one substrate conductive structure CDB. For example, the substrate SB has a plurality of conductive pads CP configured to be electrically connected to the acoustic component AC, but not limited thereto. For example, the substrate SB has a conductive ring CR, but not limited thereto.

The covering structure CS may be designed based on requirement(s). In the present invention, the covering structure CS may be a one-piece structure (as shown in FIG. 2) or be composed of a plurality of sub-structures. The covering structure CS may include any suitable material, such as metal, glass, silicon, germanium, plastic, polymer or a combination thereof, but not limited thereto.

As shown in FIG. 2 and FIG. 3, in the acoustic component AC which is the venting device for instance, the acoustic component AC has a membrane MB which would be actuated to move (e.g., the membrane MB is actuated to move by an actuator disposed on the membrane MB). In FIG. 2 and FIG. 3, the membrane MB has a plurality of flaps (e.g., a flap FP1 and a flap FP2) divided by at least one slit SL, and the flaps FP1 and FP2 may be actuated to move in the direction Z, so as to change a size of a venting opening between the flaps FP1 and FP2. For example, in the membrane MB shown in FIG. 2 and FIG. 3, two flaps FP1 and FP2 may be divided by one slit SL, and the venting opening is formed because of the slit SL, but not limited thereto.

In some embodiments, the acoustic component AC which is the venting device may have a plurality of modes, and the venting opening in different modes may have different sizes. For instance, the acoustic component AC which is the venting device may have three modes. In the first mode, two flaps FP1 and FP2 may be actuated and maintained as a first position to make the venting opening have a first size. In some embodiments, the first position may be parallel to the substrate SB, such that the venting opening of the venting device is closed and even sealed, but not limited thereto. In the second mode, two flaps FP1 and FP2 may be actuated to move along opposite directions to make the venting opening have a second size. In some embodiments, in the direction Z, one flap (e.g., the flap FP1) is upper than the first position, and another flap (e.g., the flap FP2) is lower than the first position, such that the venting opening of the venting device is opened, but not limited thereto. In the third mode, two flaps FP1 and FP2 may be actuated to lower than the first position in the direction Z, so as to make the venting opening have a third size. In some embodiments, two flaps FP1 and FP2 are close to the substrate SB, such that the venting opening of the venting device is closed. For instance, the first size is smaller than the third size, and the third size is smaller than the second size.

The mode of the venting device is controlled by the actuating signal (i.e., the electric signal), and the displacement of the membrane MB and the actuating signal applied on the actuator have a suitable relationship. The actuating signal may be an actuating voltage and/or an actuating voltage difference between two electrodes of the actuator. For instance, the displacement of the membrane MB and the actuating signal may have a linear relationship. For example, the actuating signals actuating two flaps FP1 and FP2 may be 15V in the first mode, so as to make the venting opening have the first size, but not limited thereto. For example, in the second mode, one actuating signal actuating one flap (e.g., the flap FP1) may be 30V, and another actuating signal actuating another flap (e.g., the flap FP2) may be 0V, so as to make the venting opening have the second size, but not limited thereto. For example, the actuating signals actuating two flaps FP1 and FP2 may be 0V in the third mode, so as to make the venting opening have the third size, but not limited thereto. For instance, the actuating signal is applied on the acoustic component AC (e.g., the actuator) through the conductive pad CP of the substrate SB.

The acoustic impedance of the acoustic component AC and/or the acoustic impedance of the acoustic object AO may be measured by the first sound pressure sensing device 142 and the second sound pressure sensing device 144. As shown in FIG. 1, in the condition that the sound is generated by the sound source 130 and propagates towards the first cavity 110a, the acoustic component AC (or the acoustic object AO) and the second cavity 120a, the first sound pressure sensing device 142 senses the sound pressure in the first chamber 110, the second sound pressure sensing device 144 senses the sound pressure in the second chamber 120, and the sensing result of the first sound pressure sensing device 142 and the sensing result of the second sound pressure sensing device 144 are related to the acoustic impedance of the acoustic component AC and/or the acoustic impedance of the acoustic object AO. In some embodiments, the acoustic impedance is related to the pressure difference between the first chamber 110 and the second chamber 120. Note that the sensing results of the first sound pressure sensing device 142 and the second sound pressure sensing device 144 may represent the pressures of two sides of the acoustic component AC (i.e., the first side SE1 and the second side SE2 of the acoustic component AC) and/or the pressures of two sides of the acoustic object AO (i.e., the third side SE3 and the fourth side SE4 of the acoustic component AC).

The acoustic impedance includes an acoustic inductance equivalent to an acoustic mass, an acoustic capacitance equivalent to an acoustic compliance and an acoustic resistance. The acoustic mass (i.e., the acoustic inductance) which is defined as a quantity of mass of air accelerated by a force acting on it (an air compression is neglected). Usually, the acoustic mass (i.e., the acoustic inductance) is calculated in the condition of a tube with a section $S_1$ filled with air, and the acoustic mass is calculated according to Newton's second law. In Newton's second law:

$$F_1(t) = M_m \times \frac{dv_p(t)}{dt}, \quad \text{(Eq. 1)}$$

$M_m$ is a mass of the moving air, $F_1(t)$ is a force acting on the air mass, and $v_p(t)$ is a particle velocity. According to the Eq. 1, the acoustic mass (i.e., the acoustic inductance) is calculated in the following:

$$\frac{F_1(t)}{S_1} = P_1(t) = \frac{M_m}{S_1} \times \frac{d[v_p(t) \times S_1]}{dt \times S_1} = \frac{M_m}{S_1^2} \times \frac{dv_{A1}(t)}{dt},$$

and then $$P_1(t) = M_A \times \frac{dv_{A1}(t)}{dt}, \quad \text{(Eq. 2)}$$

wherein $P_1(t)$ is the instantaneous difference pressure of the air mass $M_m$ undergoing the force $F_1(t)$, $v_{A1}(t)$ is the volume velocity, and $M_A$ is the acoustic mass defined as a ratio of the air mass $M_m$ undergoing the force $F_1(t)$ to the square of the section Si (the unit of $M_A$ is kilogram per meter powered four ($kg/m^4$)).

The acoustic compliance (i.e., the acoustic capacitance) is derived from a mechanical compliance. The mechanical compliance $C_m$ is a directly proportional ratio of an element of a displacement of a mechanical system to a force acting on this element (e.g., the mechanical system is a spring).

The acoustic compliance (i.e., the acoustic capacitance) is a characteristic of a volume VL of gas compressed by a force without causing acceleration to the gas itself. Usually, the acoustic compliance (i.e., the acoustic capacitance) is calculated in the condition that a box containing the volume VL and an opening for the entrance of pressure variation. According to the above mechanical compliance $C_m$, the acoustic compliance (i.e., the acoustic capacitance) is calculated in the following:

$$F_2(t) = \frac{1}{C_m} \times X(t) = \frac{1}{C_m} \times \frac{VL}{S_2} = \frac{1}{C_m S_2^2} \int v_{A2}(t) dt,$$

next $$\frac{F_2(t)}{S_2} = P_2(t) = \frac{1}{C_m S_2^2} \int v_{A2}(t) dt,$$

and then $$P_2(t) = \frac{1}{C_A} \int v_{A2}(t) dt, \quad \text{(Eq. 3)}$$

$F_2(t)$ is the force compressing the volume VL, $X(t)$ is a displacement, $S_2$ is a section of volume VL, $P_2(t)$ is the instantaneous pressure acting on the volume VL, $v_{A2}(t)$ is the volume velocity of air flowing into the volume VL undergoing the pressure $P_2(t)$, and CA is the acoustic compliance of the volume VL undergoing the compression (the unit of CA is meter powered five per Newton ($m^5/N$)).

The acoustic resistance is derived from a mechanical resistance. The mechanical resistance $R_m$ is a directly proportional ratio of a force acting on an element of a mechanical system to a mechanical velocity of this element (e.g., the mechanical system is a dashpot).

The acoustic resistance is a characteristic causing losses due to the flowing of air through this element. For example, the main cause of losses is the viscous movement of air through a fine mesh screen or a tube with a very small section. According to the above mechanical resistance $R_m$, the acoustic resistance is calculated in the following:

$$F_3(t) = R_m \times v_p(t) = \frac{R_m}{S_3} \times v_p(t) \times S_3 = \frac{R_m}{S_3} \times v_{A3}(t),$$

next $$\frac{F_3(t)}{S_3} = P_3(t) = \frac{R_m}{S_3^2} \times v_{A3}(t),$$

and then $P_3(t) = R_A \times v_{A3}(t)$ (Eq. 4), wherein $S_3$ is a section of the element, $F_3(t)$ is a force acting on the air flowing through the section $S_3$ of the element, $v_p(t)$ is a particle velocity passing through the section $S_3$ of the element, $v_{A3}(t)$ is the volume velocity of the air passing through the section $S_3$ of the element, $P_3(t)$ is the pressure acting on the air, and $R_A$ is the acoustical resistance due to the viscosity friction of the air passing through the section $S_3$ of the element (the unit of $R_A$ is Newton second per meter powered five ($Ns/m^5$)).

In some embodiments, according to the structure of the acoustic component AC (e.g., the aforementioned venting device), an acoustic impedance of the acoustic component AC may include an acoustic inductance and an acoustic resistance, but not limited thereto. In some embodiments, according to the structure of the acoustic object AO, an overall acoustic impedance of the acoustic object AO may include an acoustic inductance and an acoustic resistance.

Figure 4:
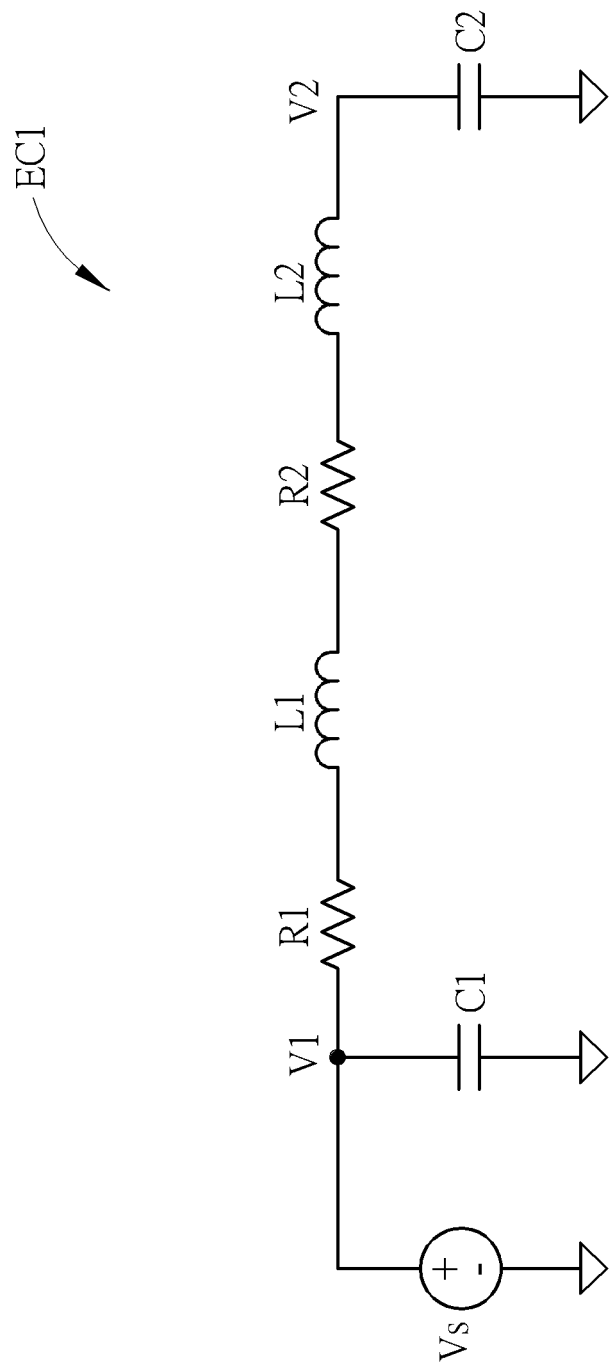
FIG. 4 is a schematic diagram illustrating an equivalent circuit of an acoustic impedance measuring system with an acoustic object according to an embodiment of the present invention.

Referring to FIG. 4, FIG. 4 is a schematic diagram illustrating an equivalent circuit of an acoustic impedance measuring system with an acoustic object according to an embodiment of the present invention, wherein the equivalent circuit EC1 of the acoustic impedance measuring system 100 with the acoustic object AO is changed according to the type of the acoustic component AC and/or the acoustic object AO, and the equivalent circuit EC1 shown in FIG. 4 is an exemplary example. As shown in FIG. 4, in the equivalent circuit EC1 of the acoustic impedance measuring system 100, the acoustic object AO may be equivalent to a first inductor L1, a first resistor R1, a first resistor L2 and a second resistor R2 which are connected in series, such that the overall acoustic impedance of the acoustic object AO may be a sum of a first acoustic inductance caused by the first inductor L1, a first acoustic resistance caused by the first resistor R1, a second acoustic impedance caused by the first resistor L2 and a second acoustic resistance caused by the second resistor R2. In FIG. 4, the acoustic component AC may be equivalent to the first inductor L1 and the first resistor R1 connected in series, such that the acoustic impedance of the acoustic component AC may be a sum of the first acoustic inductance and the first acoustic resistance. In FIG. 4, the structure other than the acoustic component AC in the acoustic object AO (e.g., the substrate SB and the covering structure CS) may be equivalent to the first resistor L2 and the second resistor R2 connected in series, such that the acoustic impedance of this structure may be a sum of the second acoustic inductance and the second acoustic resistance.

Since the acoustic component AC which is the venting device has a plurality of modes, the acoustic component AC in different modes may have different acoustic impedances. Namely, the first acoustic inductance and/or the first acoustic resistance may be changed if the mode of the acoustic component AC is changed.

As shown in FIG. 1 and FIG. 4, the first chamber 110 may be equivalent to a first capacitor C1 in the equivalent circuit EC1, such that an acoustic impedance of the first chamber 110 may be a first acoustic capacitance caused by the first capacitor C1. As shown in FIG. 1 and FIG. 4, the second chamber 120 may be equivalent to a second capacitor C2 in the equivalent circuit EC1, such that an acoustic impedance of the second chamber 120 may be a second acoustic capacitance caused by the second capacitor C2. The value of the first acoustic capacitance may be related (proportional) to a volume of the first cavity 110a inside the first chamber 110, and the value of the second acoustic capacitance may be related (proportional) to a volume of the second cavity 120a inside the first chamber 110. As shown in FIG. 1 and FIG. 4, in the equivalent circuit EC1, the sound source 130 may be equivalent to a voltage source Vs, and the sound pressure of the sound generated by the sound source 130 may be equivalent to an input voltage. As shown in FIG. 1 and FIG. 4, in the equivalent circuit EC1, the sound pressure sensed by the first sound pressure sensing device 142 may be equivalent to a voltage V1 shown in FIG. 4, and the sound pressure sensed by the second sound pressure sensing device 144 may be equivalent to a voltage V2 shown in FIG. 4.

The overall acoustic impedance of the acoustic object AO may be calculated according to the equivalent circuit EC1 shown in FIG. 4. For example, since the sound pressure of the sound generated by the sound source 130 (i.e., the input voltage of the voltage source Vs in FIG. 4), the volume of the first cavity 110a inside the first chamber 110 (i.e., the first acoustic capacitance) and the volume of the second cavity 120a inside the second chamber 120 (i.e., the second acoustic capacitance) are known, and the sound pressure in the first chamber 110 (i.e., the voltage V1 in FIG. 4) and the sound pressure in the second chamber 120 (i.e., the voltage V2 in FIG. 4) are sensed in a measuring process, the overall acoustic impedance of the acoustic object AO (i.e., a sum of the first acoustic inductance, the first acoustic resistance, the second acoustic impedance and the second acoustic resistance) may be calculated by Kirchhoff's current law (KCL), but not limited thereto.

Figure 5:
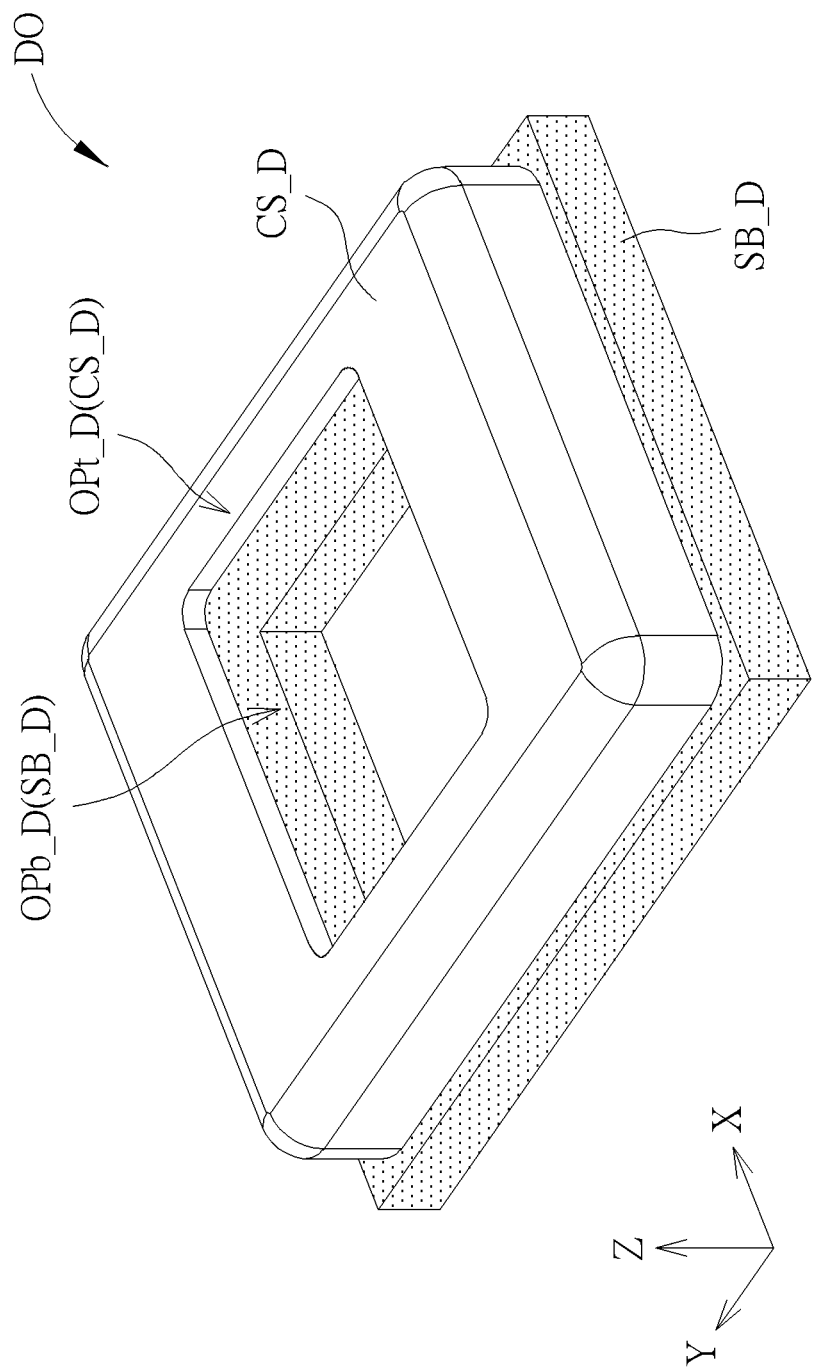
FIG. 5 is a schematic diagram is a schematic diagram illustrating a dummy object according to an embodiment of the present invention.
Figure 6:
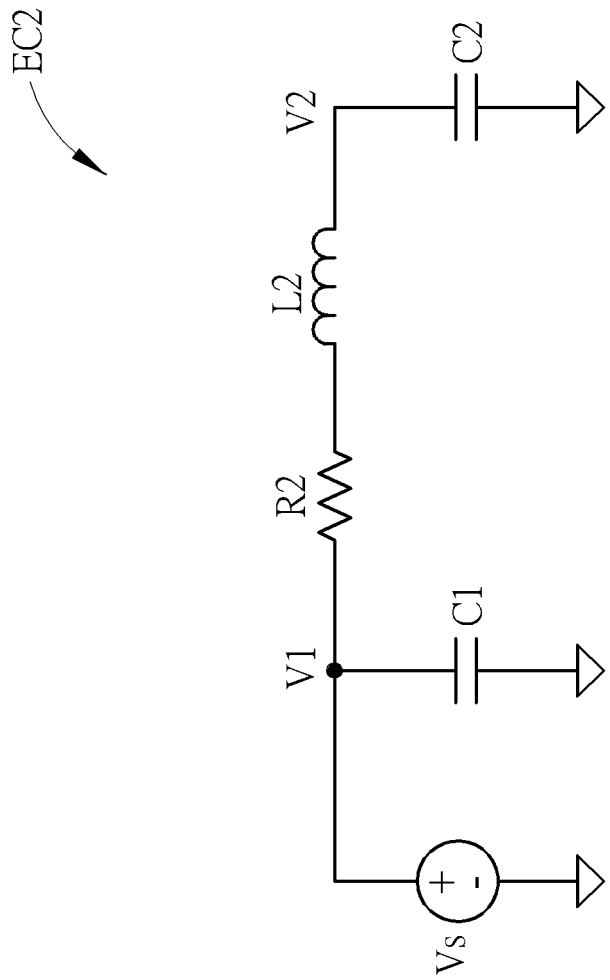
FIG. 6 is a schematic diagram illustrating an equivalent circuit of an acoustic impedance measuring system with a dummy object according to an embodiment of the present invention.

Referring to FIG. 5 and FIG. 6, FIG. 5 is a schematic diagram is a schematic diagram illustrating a dummy object according to an embodiment of the present invention, and FIG. 6 is a schematic diagram illustrating an equivalent circuit of an acoustic impedance measuring system with a dummy object according to an embodiment of the present invention. In order to accurately measure the acoustic impedance of the acoustic component AC, as shown in FIG. 5, a dummy object DO is provided, wherein the dummy object DO includes all structures in the acoustic object AO except for the acoustic component AC (i.e., a substrate SB_D having a bottom opening OPb_D and a covering structure CS_D having a top opening OPt_D of the dummy object DO are respectively the same as the substrate SB and the covering structure CS of the acoustic object AO). Namely, as shown in FIG. 4 and FIG. 6, the dummy object DO may be equivalent to the first resistor L2 and the second resistor R2 connected in series, such that the acoustic impedance of the dummy object DO may be a sum of the second acoustic inductance and the second acoustic resistance. As shown in FIG. 5, the dummy object DO includes the substrate SB_D and the covering structure CS_D at least.

If the acoustic object AO shown in FIG. 1 is replaced by the dummy object DO shown in FIG. 5, the acoustic component AC is absent, and the equivalent circuit EC1 of the acoustic impedance measuring system 100 with the acoustic object AO shown in FIG. 4 is replaced by the equivalent circuit EC2 of the acoustic impedance measuring system 100 with the dummy object DO is shown in FIG. 6. Compared with the equivalent circuit EC1 shown in FIG. 4, the equivalent circuit EC2 shown in FIG. 6 may have the first resistor L2 and the second resistor R2 equivalent to the dummy object DO, and the equivalent circuit EC2 shown in FIG. 6 may not have the first inductor L1 and the first resistor R1 equivalent to the acoustic component AC.

The dummy acoustic impedance of the dummy object DO may be calculated according to the equivalent circuit EC2 shown in FIG. 6. For example, since the sound pressure of the sound generated by the sound source 130 (i.e., the input voltage of the voltage source Vs in FIG. 6), the volume of the first cavity 110a inside the first chamber 110 (i.e., the first acoustic capacitance) and the volume of the second cavity 120a inside the second chamber 120 (i.e., the second acoustic capacitance) are known, and the sound pressure in the first chamber 110 (i.e., the voltage V1 in FIG. 6) and the sound pressure in the second chamber 120 (i.e., the voltage V2 in FIG. 6) are sensed in a dummy measuring process, the dummy acoustic impedance of the dummy object DO (i.e., a sum of the second acoustic inductance and the second acoustic resistance) may be calculated by Kirchhoff's current law, but not limited thereto.

According to the above, the acoustic impedance of the acoustic component AC (i.e., a sum of the first acoustic inductance and the first acoustic resistance) would be obtained by the dummy acoustic impedance of the dummy object DO and the overall acoustic impedance of the acoustic object AO. For example, the acoustic impedance of the acoustic component AC (i.e., a sum of the first acoustic inductance and the first acoustic resistance) would be obtained by subtracting the dummy acoustic impedance of the dummy object DO from the overall acoustic impedance of the acoustic object AO, but not limited thereto.

In the present invention, the acoustic impedance measuring system 100 may include any suitable electronic device. In some embodiments, the acoustic impedance measuring system 100 may include a signal processing device disposed outside the first chamber 110 and the second chamber 120, wherein the signal processing device configured to provide the signal, receive the signal and/or analyze the signal. The signal processing device may be any suitable device. For instance, the signal processing device may be a computer, but not limited thereto.

The signal processing device may be electrically connected to the sound source 130, the first sound pressure sensing device 142 and the second sound pressure sensing device 144, wherein the signal processing device may provide an audio signal to the sound source 130 for making the sound source 130 generate the sound, and the signal processing device may receive and analyze sensing signals generated by the first sound pressure sensing device 142 and the second sound pressure sensing device 144. For example, the signal processing device may include an audio signal providing device configured to provide the audio signal to the sound source 130, but not limited thereto. For example, the signal processing device may include an analyzer configured to receive and analyze the sensing signals generated by the first sound pressure sensing device 142 and the second sound pressure sensing device 144.

In some embodiments, the acoustic impedance measuring system 100 may include a mode changing device electrically connected to the acoustic component AC, wherein the mode changing device is configured to control the mode of the acoustic component AC (e.g., the mode of the acoustic object AO) by providing corresponding signal(s). For example, the mode changing device is electrically connected to the acoustic component AC through the conductive pad(s) CP, but not limited thereto. For example, the mode changing device may be integrated in the signal processing device, but not limited thereto.

When the acoustic impedance of the acoustic component AC is measured, the mode changing device may change the modes of the acoustic component AC (the acoustic component AC and/or the acoustic object AO may be switched into one of three modes). Thus, the acoustic impedance measuring system 100 may measure the acoustic impedances of the acoustic component AC in different modes.

Figure 7:
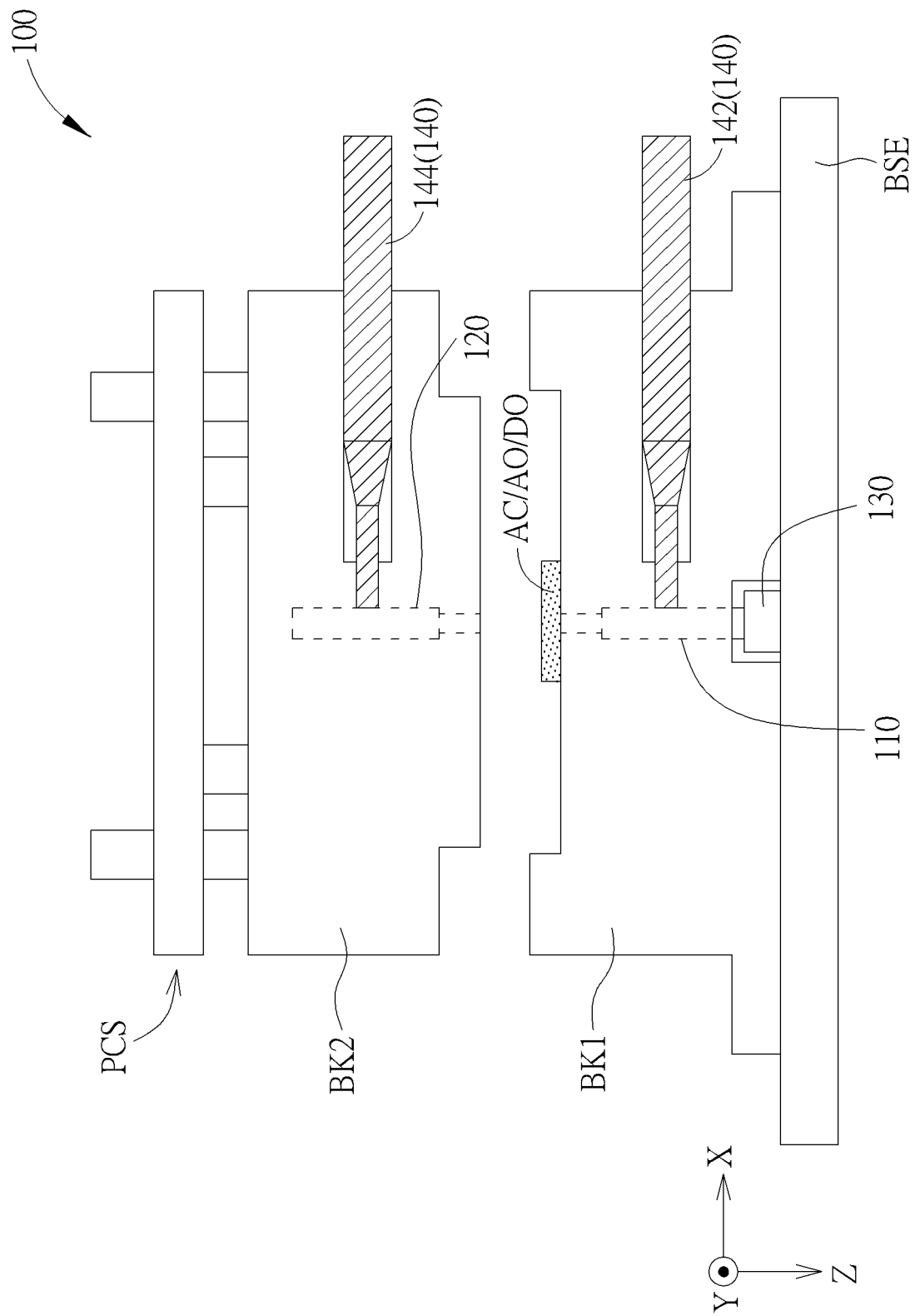
FIG. 7 and FIG. 8 are schematic diagrams illustrating an acoustic impedance measuring system according to an exemplary example of the present invention.
Figure 8:
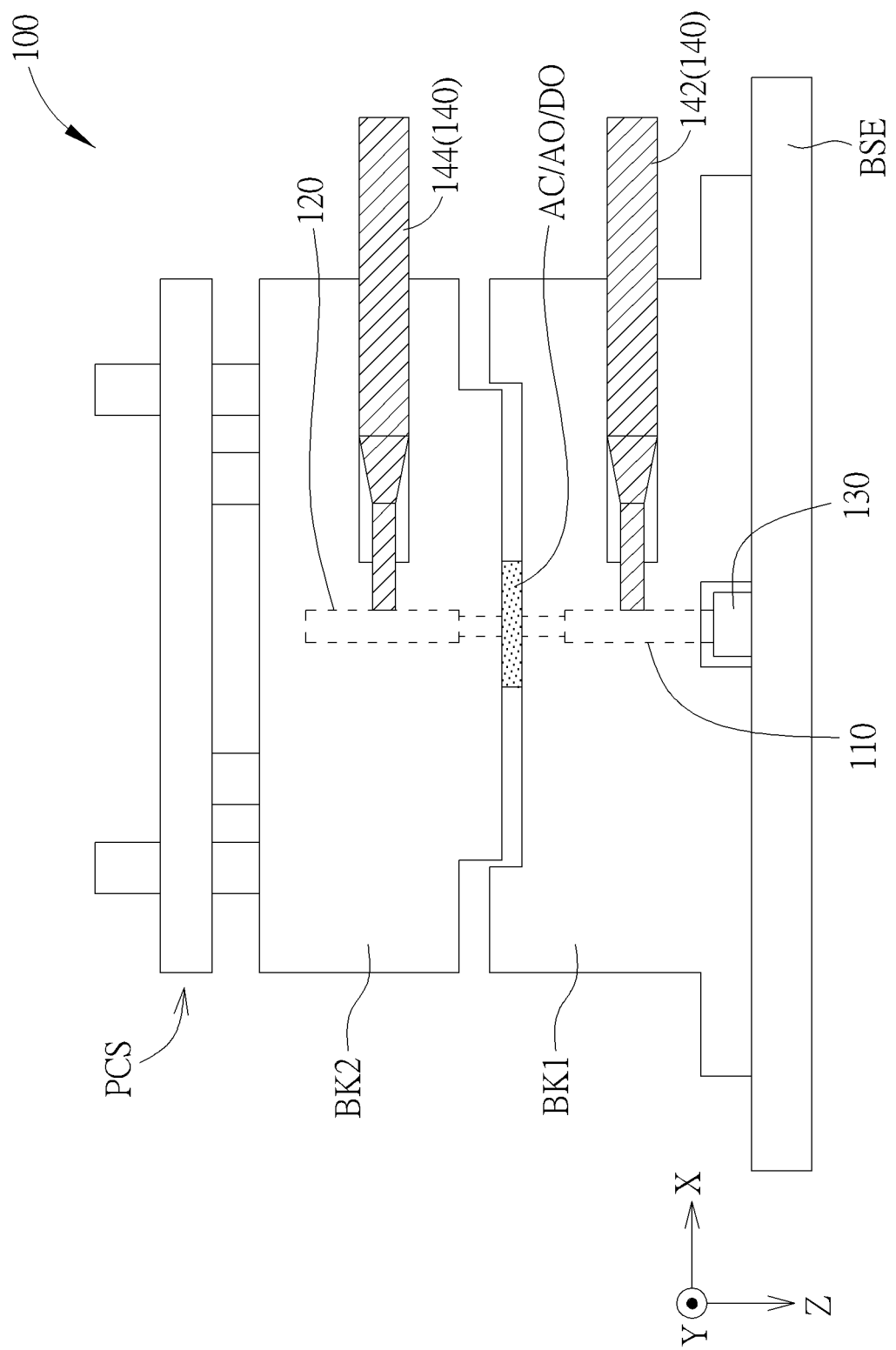

The acoustic impedance measuring system 100 may be achieved in any suitable way. Referring to FIG. 7 and FIG. 8, FIG. 7 and FIG. 8 are schematic diagrams illustrating an acoustic impedance measuring system according to an exemplary example of the present invention, wherein the first chamber 110 and the second chamber 120 are disconnected to each other in FIG. 7, and the first chamber 110 and the second chamber 120 are connected to each other in FIG. 8. As shown in FIG. 7 and FIG. 8, the acoustic impedance measuring system 100 may include a first blocky structure BK1 and a second blocky structure BK2, wherein the first blocky structure BK1 includes the first chamber 110, and the second blocky structure BK2 includes the second chamber 120. Furthermore, the acoustic impedance measuring system 100 may include a base BSE on which the first blocky structure BK1 is disposed.

In FIG. 7 and FIG. 8, the acoustic impedance measuring system 100 may include a chamber position changing structure PCS making the first blocky structure BK1 and/or the second blocky structure BK2 move, such that the chamber position changing structure PCS may bring the first blocky structure BK1 and the second blocky structure BK2 close to each other or away from each other (i.e., the chamber position changing structure PCS may bring the first chamber 110 and the second chamber 120 close to each other or away from each other). For example, in FIG. 7 and FIG. 8, the chamber position changing structure PCS makes the second blocky structure BK2 move, but not limited thereto.

In some embodiments, the acoustic component AC, the acoustic object AO or the dummy object DO may be disposed between the first blocky structure BK1 and the second blocky structure BK2 when the first blocky structure BK1 and the second blocky structure BK2 (i.e., the first chamber 110 and the second chamber 120) are disconnected. After the acoustic component AC, the acoustic object AO or the dummy object DO is disposed between the first blocky structure BK1 and the second blocky structure BK2 (e.g., disposed on the first blocky structure BK1), the chamber position changing structure PCS may bring the first chamber 110 and the second chamber 120 close to each other, so as to make the first chamber 110 and the second chamber 120 be connected to each other.

Moreover, the first blocky structure BK1 and/or the second blocky structure BK2 may have at least one conductive structure configured to be electrically connected to the acoustic component AC. For example, the second blocky structure BK2 may have at least one conductive structure, such that the mode changing device is electrically connected to the acoustic component AC through the conductive structure(s) of the second blocky structure BK2 and the conductive pad(s) CP of the substrate SB, but not limited thereto.

In the following, the details of an acoustic impedance measuring method will be further exemplarily explained.

Figure 9:
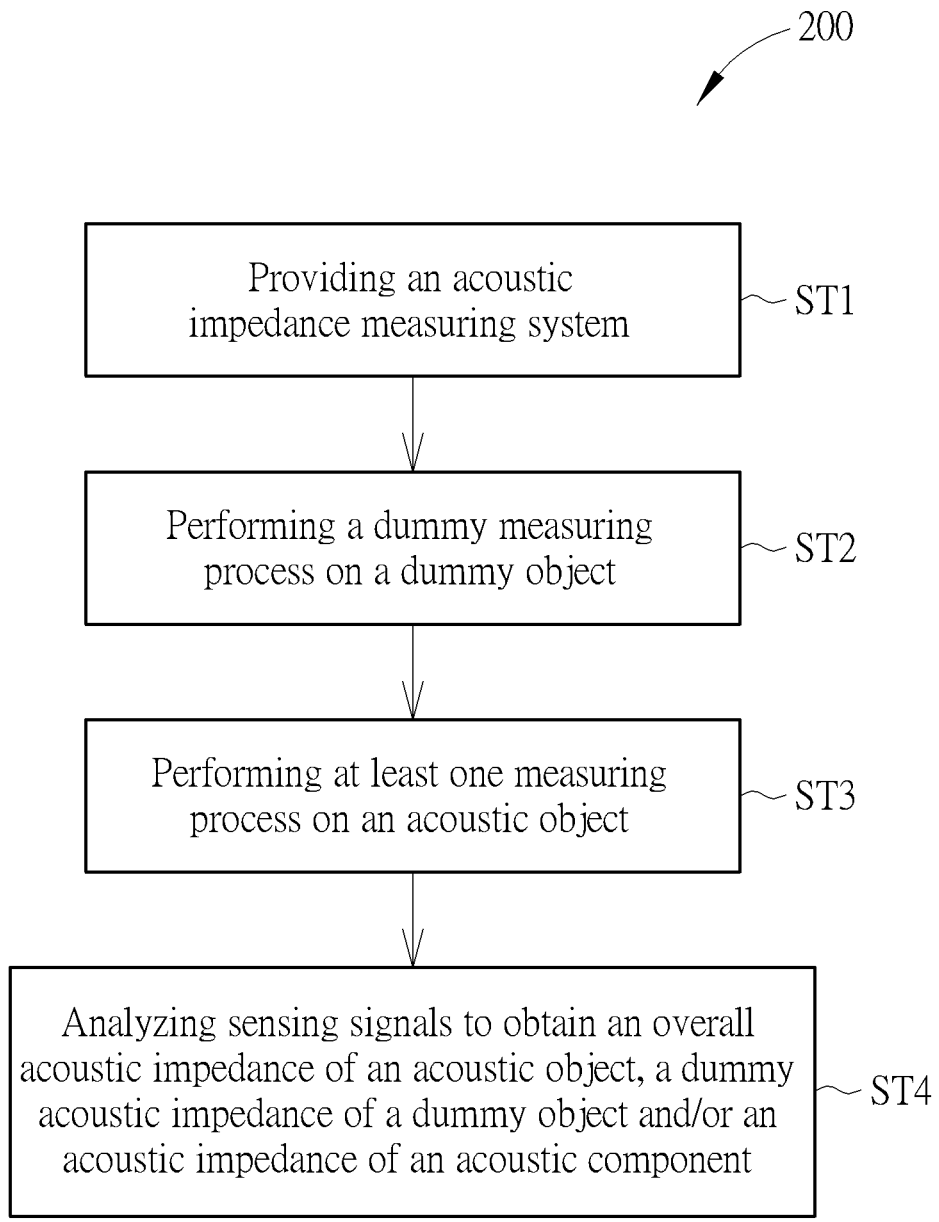
FIG. 9 is a schematic diagram illustrating a flowchart of an acoustic impedance measuring method according to an embodiment of the present invention.

Referring to FIG. 9, FIG. 9 is a schematic diagram illustrating a flowchart of an acoustic impedance measuring method according to an embodiment of the present invention. It is to be appreciated that the flowchart shown in FIG. 9 is exemplary. In some embodiments, some of the steps may be performed simultaneously, or in a different order than shown in FIG. 9. In some embodiments, before or after one of the existing steps of the acoustic impedance measuring method 200 shown in FIG. 9, any other suitable step may be added. Regarding the following contents, the acoustic impedance measuring method 200 shall be described with reference to FIG. 9. However, the acoustic impedance measuring method 200 is not limited by the following embodiment.

In the step ST1 of FIG. 9, an acoustic impedance measuring system 100 is provided, wherein the acoustic impedance measuring system 100 is described in the above, and these contents will not be redundantly described.

In the step ST2 of FIG. 9, a dummy measuring process is performed on a dummy object DO. The dummy object DO is described in the above, and these contents will not be redundantly described.

In the dummy measuring process, the dummy object DO is disposed between the first chamber 110 and the second chamber 120. For example, in the acoustic impedance measuring system 100 shown in FIG. 7 and FIG. 8, the first chamber 110 and the second chamber 120 are close to each other after the dummy object DO is disposed between the first chamber 110 and the second chamber 120. Then, a first dummy sound pressure in the first chamber 110 and a second dummy sound pressure in the second chamber 120 are respectively sensed by the first sound pressure sensing device 142 and the second sound pressure sensing device 144 when the sound is generated by the sound source 130, wherein the dummy acoustic impedance of the dummy object DO is obtained according to the first dummy sound pressure and the second dummy sound pressure.

In the step ST3 of FIG. 9, at least one measuring process is performed on an acoustic object AO. The acoustic object AO is described in the above, and these contents will not be redundantly described. Since the acoustic component AC which is the venting device has the first mode, the second mode and the third mode, a first measuring process is performed on the acoustic object AO with the first mode (i.e., the acoustic component AC is in the first mode), a second measuring process is performed on the acoustic object AO with the second mode (i.e., the acoustic component AC is in the second mode), and a third measuring process is performed on the acoustic object AO with the third mode (i.e., the acoustic component AC is in the third mode).

In the first measuring process, the acoustic object AO is disposed between the first chamber 110 and the second chamber 120. For example, in the acoustic impedance measuring system 100 shown in FIG. 7 and FIG. 8, the first chamber 110 and the second chamber 120 are close to each other after the acoustic object AO is disposed between the first chamber 110 and the second chamber 120. Then, a first sound pressure in the first chamber 110 and a second sound pressure in the second chamber 120 are respectively sensed by the first sound pressure sensing device 142 and the second sound pressure sensing device 144 when the sound is generated by the sound source 130, wherein a first overall acoustic impedance of the acoustic object AO with the first mode is obtained according to the first sound pressure and the second sound pressure.

In the second measuring process, a third sound pressure in the first chamber 110 and a fourth sound pressure in the second chamber 120 are respectively sensed by the first sound pressure sensing device 142 and the second sound pressure sensing device 144 when the sound is generated by the sound source 130, wherein a second overall acoustic impedance of the acoustic object AO with the second mode is obtained according to the third sound pressure and the fourth sound pressure.

In the third measuring process, a fifth sound pressure in the first chamber 110 and a sixth sound pressure in the second chamber 120 are respectively sensed by the first sound pressure sensing device 142 and the second sound pressure sensing device 144 when the sound is generated by the sound source 130, wherein a third overall acoustic impedance of the acoustic object AO with the third mode is obtained according to the fifth sound pressure and the sixth sound pressure.

In the step ST4 of FIG. 9, the sensing signals generated by the first sound pressure sensing device 142 and the second sound pressure sensing device 144 are analyzed to obtain the overall acoustic impedance of the acoustic object AO, the dummy acoustic impedance of the dummy object DO and the acoustic impedance of the acoustic component AC. In the dummy object DO, the dummy acoustic impedance of the dummy object DO is obtained according to the first dummy sound pressure and the second dummy sound pressure. In the acoustic object AO, the first overall acoustic impedance of the acoustic object AO with the first mode is obtained according to the first sound pressure and the second sound pressure, the second overall acoustic impedance of the acoustic object AO with the second mode is obtained according to the third sound pressure and the fourth sound pressure, and the third overall acoustic impedance of the acoustic object AO with the third mode is obtained according to the fifth sound pressure and the sixth sound pressure. Note that the calculation of the dummy acoustic impedance of the dummy object DO and the calculation of the overall acoustic impedance of the acoustic object AO are described in the above, and these contents will not be redundantly described.

In the acoustic component AC, a first acoustic impedance of the acoustic component AC with the first mode is obtained according to the first overall acoustic impedance and the dummy acoustic impedance, a second acoustic impedance of the acoustic component AC with the second mode is obtained according to the second overall acoustic impedance and the dummy acoustic impedance, and a third acoustic impedance of the acoustic component AC with the third mode is obtained according to the third overall acoustic impedance and the dummy acoustic impedance. The calculation of the acoustic impedance of the acoustic component AC is described in the above. For example, the first acoustic impedance is obtained by subtracting the dummy acoustic impedance from the first overall acoustic impedance, the second acoustic impedance is obtained by subtracting the dummy acoustic impedance from the second overall acoustic impedance, and the third acoustic impedance is obtained by subtracting the dummy acoustic impedance from the third overall acoustic impedance, but not limited thereto.

Figure 10:
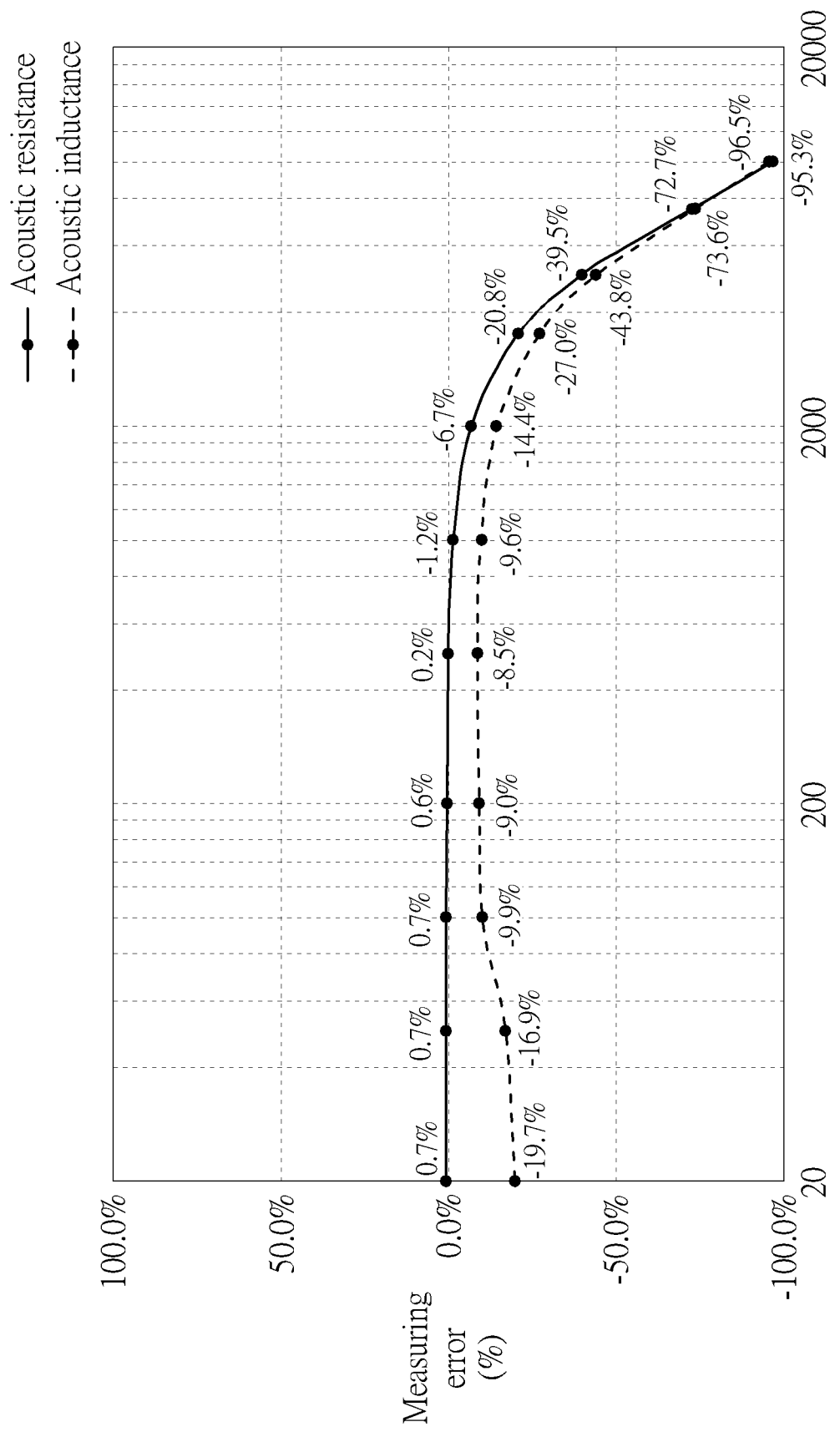
FIG. 10 is a schematic diagram illustrating a measuring error of a first acoustic impedance of an acoustic component with a first mode according to an embodiment of the present invention.
Figure 11:
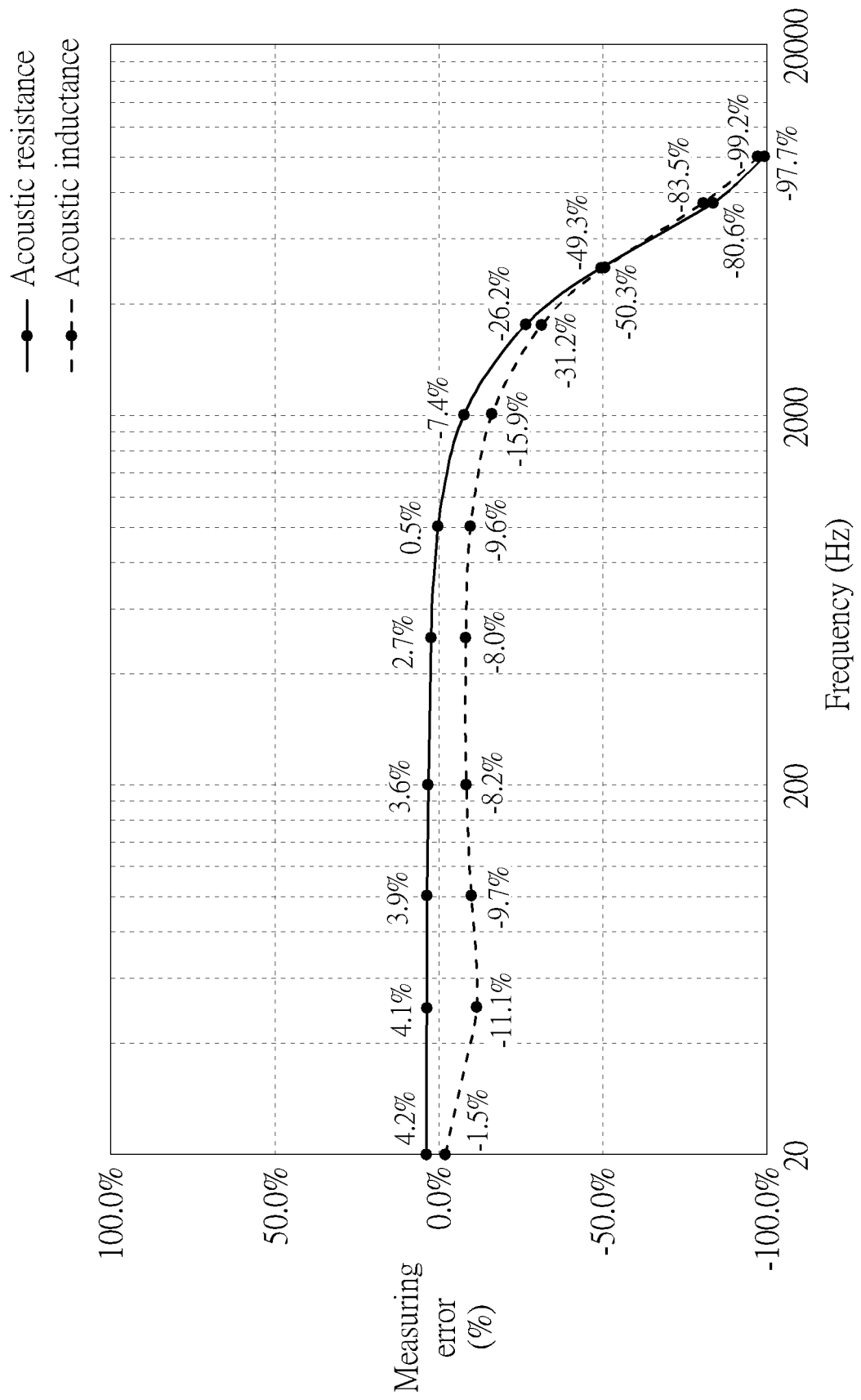
FIG. 11 is a schematic diagram illustrating a measuring error of a second acoustic impedance of an acoustic component with a second mode according to an embodiment of the present invention.

Referring to FIG. 10 and FIG. 11, FIG. 10 is a schematic diagram illustrating a measuring error of a first acoustic impedance of an acoustic component with a first mode according to an embodiment of the present invention, and FIG. 11 is a schematic diagram illustrating a measuring error of a second acoustic impedance of an acoustic component with a second mode according to an embodiment of the present invention, wherein FIG. 10 and FIG. 11 show the measuring error of the acoustic resistance and the measuring error of the acoustic inductance. The measuring error shown in FIG. 10 is related to the measuring first acoustic impedance and the simulating first acoustic impedance, and the measuring error shown in FIG. 11 is related to the measuring second acoustic impedance and the simulating second acoustic impedance. The measuring acoustic impedance is obtained by the acoustic impedance measuring system 100 (e.g. the acoustic impedance measuring system 100 shown in FIG. 7 and FIG. 8) and the acoustic impedance measuring method 200 of the present invention, and the simulating acoustic impedance is simulated by any suitable simulation software. In the present invention, the measuring error is a ratio of a difference between the measuring acoustic impedance and the simulating acoustic impedance to the simulating acoustic impedance.

In the present invention, Helmholtz resonance may be observed in the chamber(s) of the acoustic impedance measuring system 100, and Helmholtz resonance may influence the measurement of the acoustic impedance. In some embodiments, when Helmholtz resonance occurs, the first chamber 110 and the second chamber 120 may resonate, such that the sensing results of the first sound pressure sensing device 142 and the second sound pressure sensing device 144 could not represent the pressures of two sides of the acoustic component AC (i.e., the first side SE1 and the second side SE2 of the acoustic component AC) and/or the pressures of two sides of the acoustic object AO (i.e., the third side SE3 and the fourth side SE4 of the acoustic component AC), thereby enhancing the measuring error. For example, in the acoustic impedance measuring system 100 shown in FIG. 7 and FIG. 8 and the measuring errors shown in FIG. 10 and FIG. 11, a Helmholtz resonance frequency may range from 2000 Hz to 3000 Hz, but not limited thereto. For example, the Helmholtz resonance frequency may be increased by decreasing the volume of the first cavity 110a and the volume of the second cavity 120a, but not limited thereto.

As shown in FIG. 10 and FIG. 11, when the frequency of the sound generated by the sound source 130 is less than the Helmholtz resonance frequency (e.g., less than 2000 Hz), the measuring error of the acoustic impedance may be less than 20%, 15%, 10% or 5%, but not limited thereto.

In summary, since the acoustic impedance measuring system and the acoustic impedance measuring method are provided, the acoustic impedance of the acoustic component would be measured.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An acoustic impedance measuring system, configured to measure an acoustic impedance of an acoustic component, the acoustic impedance measuring system comprising:
    a first chamber, wherein a first cavity exists inside the first chamber;
    a second chamber, wherein a second cavity exists inside the second chamber;
    a first sound pressure sensing device configured to sense a sound pressure in the first chamber;
    a second sound pressure sensing device configured to sense a sound pressure in the second chamber; and
    a sound source connected to the first chamber, wherein the sound source generates a sound propagating towards the first cavity;
    wherein the acoustic component is disposed between the first chamber and the second chamber for being measured the acoustic impedance of the acoustic component, and the acoustic impedance of the acoustic component is measured by the first sound pressure sensing device and the second sound pressure sensing device.

2. The acoustic impedance measuring system of claim 1, wherein the first chamber has a sound inlet connected to the sound source, and the acoustic component faces the sound inlet.

3. The acoustic impedance measuring system of claim 1, wherein the second chamber has a wall, and the acoustic component faces the wall.

4. The acoustic impedance measuring system of claim 1, wherein a first side of the acoustic component is connected to and faces the first cavity of the first chamber, and a second side of the acoustic component is connected to and faces the second cavity of the second chamber.

5. The acoustic impedance measuring system of claim 1, wherein the first chamber is a tubular structure, and the second chamber is another tubular structure.

6. The acoustic impedance measuring system of claim 1, further comprising a chamber position changing structure configured to bring the first chamber and the second chamber close to each other.

7. The acoustic impedance measuring system of claim 1, further comprising a blocky structure comprising the first chamber or the second chamber, wherein the blocky structure has at least one conductive structure configured to be electrically connected to the acoustic component.

8. The acoustic impedance measuring system of claim 1, further comprising an analyzer electrically connected to the first sound pressure sensing device and the second sound pressure sensing device, wherein the analyzer is configured to receive and analyze the sensing signals generated by the first sound pressure sensing device and the second sound pressure sensing device.

9. The acoustic impedance measuring system of claim 1, further comprising a mode changing device configured to control a mode of the acoustic component.

10. The acoustic impedance measuring system of claim 1, wherein the acoustic impedance of the acoustic component comprises an acoustic inductance and an acoustic resistance.

11. An acoustic impedance measuring method, comprising:
    providing an acoustic impedance measuring system, wherein the acoustic impedance measuring system comprises:
        a first chamber, wherein a first cavity exists inside the first chamber;
        a second chamber, wherein a second cavity exists inside the second chamber; and
        a sound source connected to the first chamber, wherein the sound source generates a sound propagating towards the first cavity; and
    performing a first measuring process on an acoustic object, wherein the first measuring process comprises:
        disposing the acoustic object between the first chamber and the second chamber; and
        sensing a first sound pressure in the first chamber and a second sound pressure in the second chamber when generating the sound by the sound source, wherein a first overall acoustic impedance of the acoustic object is obtained according to the first sound pressure and the second sound pressure.

12. The acoustic impedance measuring method of claim 11, further comprising:
    performing a dummy measuring process on a dummy object, wherein the dummy measuring process comprises:
        disposing the dummy object between the first chamber and the second chamber; and
        sensing a first dummy sound pressure in the first chamber and a second dummy sound pressure in the second chamber when generating the sound by the sound source, wherein
        a dummy acoustic impedance of the dummy object is obtained according to the first dummy sound pressure and the second dummy sound pressure;
    wherein the acoustic object comprises a first substrate, a first covering structure and an acoustic component disposed between the first substrate and the first covering structure, the dummy object comprises a second substrate and a second covering structure, the first substrate is the same as the second substrate, and the first covering structure is the same as the second covering structure;
    wherein a first acoustic impedance of the acoustic component is obtained according to the first overall acoustic impedance and the dummy acoustic impedance.

13. The acoustic impedance measuring method of claim 11, wherein the first measuring process is performed on the acoustic object with a first mode, and the acoustic impedance measuring method further comprises:
    performing a second measuring process on the acoustic object with a second mode, wherein the second measuring process comprises:
    disposing the acoustic object with the second mode between the first chamber and the second chamber; and
    sensing a third sound pressure in the first chamber and a fourth sound pressure in the second chamber when generating the sound by the sound source, wherein a second overall acoustic impedance of the acoustic object with the second mode is obtained according to the third sound pressure and the fourth sound pressure.

14. The acoustic impedance measuring method of claim 13, wherein the acoustic object comprises an acoustic component, the acoustic component has an opening, the opening of the acoustic component in the first mode has a first size, the opening of the acoustic component in the second mode has a second size, and the first size is different form the second size.

15. The acoustic impedance measuring method of claim 13, wherein the acoustic impedance measuring system further comprises a mode changing device, and the acoustic object is switched between the first mode and the second mode by a signal provided by the mode changing device.

16. The acoustic impedance measuring method of claim 11, wherein the acoustic impedance measuring system further comprises:
    a first sound pressure sensing device configured to sense the first sound pressure; and
    a second sound pressure sensing device configured to sense the second sound pressure.

17. The acoustic impedance measuring method of claim 11, the first chamber and the second chamber are close to each other after the acoustic object is disposed between the first chamber and the second chamber.

18. The acoustic impedance measuring method of claim 11, wherein the first overall acoustic impedance of the acoustic object comprises an acoustic inductance and an acoustic resistance.

19. The acoustic impedance measuring method of claim 11, wherein the first chamber has a sound inlet connected to the sound source, and the acoustic object faces the sound inlet.

20. The acoustic impedance measuring method of claim 11, wherein the second chamber has a wall, and the acoustic object faces the wall.

\* \* \* \* \*